US011050208B2

(12) United States Patent
Yu et al.

(10) Patent No.: US 11,050,208 B2
(45) Date of Patent: Jun. 29, 2021

(54) PRE-SCREENING, COMPLIANT PIN GUIDING AND QUALITY MONITORING PRESS-FIT APPARATUS

(71) Applicant: International Business Machines Corporation, Armonk, NY (US)

(72) Inventors: Qiuyi Yu, Shenzhen (CN); Zhongfeng Yang, Shenzhen (CN); Rui Ma, Shenzhen (CN); Xiyuan Yin, Shenzhen (CN); Zhiying Fan, Beijing (CN); Tao Song, Shenzhen (CN); Jun Hu, Shenzhen (CN); Pengcheng Xie, Shenzhen (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 16/176,494

(22) Filed: Oct. 31, 2018

(65) Prior Publication Data

US 2020/0136333 A1 Apr. 30, 2020

(51) Int. Cl.
*B23P 19/00* (2006.01)
*H01R 43/20* (2006.01)

(52) U.S. Cl.
CPC ...... *H01R 43/205* (2013.01); *Y10T 29/53209* (2015.01)

(58) Field of Classification Search
CPC ................ H01R 43/205; H01R 12/585; H05K 13/0413; Y10T 29/53209; Y10T 29/53261; Y10T 29/49147; Y10T 29/49204

(Continued)

(56) References Cited

U.S. PATENT DOCUMENTS 4,434,550 A * 3/1984 Wilke ................ H05K 13/0413 29/837
4,998,892 A 3/1991 Shiley
(Continued)

FOREIGN PATENT DOCUMENTS

DE 102007051588 A1 4/2009
JP 2013052473 A 3/2013

OTHER PUBLICATIONS

Tranitz et al., "Growth Mechanisms of Tin Whiskers at Press-in Technology", IPC APEX EXPO, Feb. 28, 2012, San Diego, USA, 30 pages.

*Primary Examiner* — Donghai D Nguyen
(74) *Attorney, Agent, or Firm* — Cantor Colburn LLP; Tihon Poltavets

(57) ABSTRACT

A compliant pin pre-screening, guiding and quality monitoring apparatus is provided. The compliant pin pre-screening, guiding and quality monitoring apparatus includes a fixed plate, a movable plate, a printed circuit board (PCB) and a press-fit connector. The fixed plate defines a through-hole and is disposable above a working table. The movable plate is disposable to be urged by a bias against a first surface of the fixed plate facing the working table and includes pin extendable through the through-hole. The PCB defines a via and is disposable on a second surface of the fixed plate opposite the first surface whereby the pin is extendable through the via with the via corresponding in position to the through-hole and the pin. The press-fit connector is disposable to be secured in position proximate to the PCB and to be inserted into the via with guidance provided by the pin against the bias.

17 Claims, 3 Drawing Sheets

(58) Field of Classification Search
USPC ........................... 29/747, 755, 759, 842, 874
See application file for complete search history.

(56) References Cited

U.S. PATENT DOCUMENTS

| | | | | |
|---|---|---|---|---|
| 5,065,282 | A | 11/1991 | Polonio | |
| 5,074,030 | A * | 12/1991 | Anderson ............ | H01R 43/205 29/739 |
| 5,453,016 | A | 9/1995 | Clark et al. | |
| 5,738,550 | A | 4/1998 | Sakuraoka et al. | |
| 6,049,214 | A * | 4/2000 | Nishikawa ......... | G01R 1/07328 324/750.25 |
| 6,183,301 | B1 | 2/2001 | Paagman | |
| 6,312,296 | B1 | 11/2001 | Jones | |
| 6,494,734 | B1 | 12/2002 | Shuey | |
| 6,712,855 | B2 | 3/2004 | Martin et al. | |
| 6,835,074 | B2 * | 12/2004 | Sakata ................. | H01R 43/205 439/79 |
| 7,074,094 | B2 | 7/2006 | Kawahara et al. | |
| 7,141,073 | B2 | 11/2006 | May et al. | |
| 7,144,272 | B1 | 12/2006 | Burris et al. | |
| 7,698,809 | B2 | 4/2010 | Steckler et al. | |
| 7,862,376 | B2 | 1/2011 | Sypolt et al. | |
| 7,884,288 | B2 | 2/2011 | Meyer et al. | |
| 7,946,861 | B2 | 5/2011 | Sander | |
| 8,931,682 | B2 | 1/2015 | Timm et al. | |
| 2009/0312842 | A1 | 12/2009 | Bursac et al. | |
| 2011/0256753 | A1 | 10/2011 | Gulla | |
| 2014/0175155 | A1 | 6/2014 | Shelton et al. | |

* cited by examiner

PRE-SCREENING, COMPLIANT PIN GUIDING AND QUALITY MONITORING PRESS-FIT APPARATUS

BACKGROUND

The present invention generally relates to connections between connectors and a printed circuit board (PCB), and more specifically, to a pre-screening, compliant pin guiding and quality monitoring apparatus for press-fit processing of PCB connectors.

A PCB mechanically supports and electrically connects electronic components or electrical components using conductive tracks, pads and other features etched from one or more sheet layers of conductive material laminated onto and/or between sheet layers of a non-conductive substrate.

Press-fit technology allows manufacturers to avoid soldering when assembling PCB electronics. A press-fit connection is formed when a pin is pressed into a fitted, plated-through hole in a PCB. There are different types of press-fit connectors, including those with solid pins (which do not contort during insertion) and compliant pins (which compress or "comply" during insertion). Today, compliant pins are generally preferred because they make fewer demands on the PCB, require less force during the insertion process and produce more reliable results (with less damage).

SUMMARY

Embodiments of the present invention are directed to a compliant pin pre-screening, guiding and quality monitoring apparatus. A non-limiting example of the compliant pin pre-screening, guiding and quality monitoring apparatus includes a fixed plate, a movable plate, a printed circuit board (PCB) and a press-fit connector. The fixed plate defines a through-hole and is disposable above a working table. The movable plate is disposable to be urged by a bias against a first surface of the fixed plate facing the working table and includes pin extendable through the through-hole. The PCB defines a via and is disposable on a second surface of the fixed plate opposite the first surface whereby the pin is extendable through the via with the via corresponding in position to the through-hole and the pin. The press-fit connector is disposable to be secured in a position proximate to the PCB and to be inserted into the via with guidance provided by the pin against the bias.

Embodiments of the present invention are directed to a compliant pin pre-screening, guiding and quality monitoring apparatus. A non-limiting example of the compliant pin pre-screening, guiding and quality monitoring apparatus includes a fixed plate, a movable plate, a printed circuit board (PCB) and press-fit connectors. The fixed plate defines a through-hole array and is disposable above a working table. The movable plate is disposable to be urged by a bias against a first surface of the fixed plate facing the working table and includes a pin array with pins extendable through through-holes of the through-hole array. A printed circuit board (PCB) defines an array of vias and is disposable on a second surface of the fixed plate opposite the first surface whereby the pins are extendable through the vias with the vias corresponding in position to the through-holes and the pins. The press-fit connectors are disposable to be secured as a group in a position proximate to the PCB and to be inserted as the group into the vias with guidance provided by the pins against the bias.

Embodiments of the invention are directed to a compliant pin pre-screening, guiding and quality monitoring method. A non-limiting example of the compliant pin pre-screening, guiding and quality monitoring method includes disposing a fixed plate defining through-holes above a working table, biasing a movable plate against a lower surface of the fixed plate such that pins of the movable plate extend through the through-holes, disposing a printed circuit board (PCB) defining vias on an upper surface of the fixed plate whereby the pins extend through the vias with the vias corresponding in position to the through-holes and the pins, disposing press-fit connectors to be secured as a group in position proximate to the PCB and inserting the press-fit connectors as the group into the vias with guidance provided by the pins against the biasing of the movable plate.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
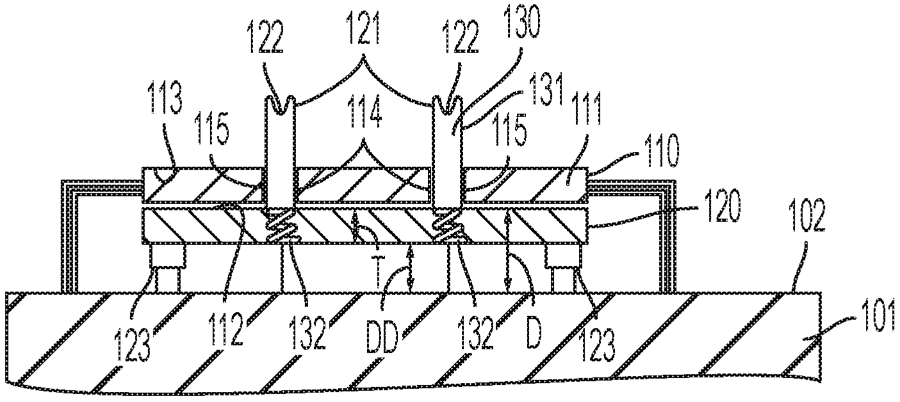
FIG. 1 is a schematic side view of a fixed plate and a movable plate of a compliant pin pre-screening, guiding and quality monitoring apparatus in accordance with embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, while compliant press-fit pin connections (hereinafter referred to as "compliant pins") are proven and widely used as interconnections between a PCB and connectors, compliant pins are subject to multiple defect modes in certain applications and it is often the case that such defect modes can only be detected after the compliant pins are fully seated. These defect modes include, but are not limited to, cases of missing pins, missing compliant pins, bent pins, bent pins with contact, under bent pins not making contact, crushed pins and back drilled hole faults. As such, defect repairs lead to inefficiencies in cost, time and yield.

Turning now to an overview of the aspects of the invention, one or more embodiments of the invention address the above-described shortcomings of the prior art by providing a compliant pin pre-screening, guiding and quality monitoring apparatus is provided. The compliant pin pre-screening, guiding and quality monitoring apparatus includes a fixed plate, a movable plate, a printed circuit board (PCB) and a press-fit connector. The fixed plate defines a through-hole and is disposable above a working table. The movable plate is disposable to be urged by a bias against a first surface of the fixed plate facing the working table and includes pin extendable through the through-hole. The PCB defines a via and is disposable on a second surface of the fixed plate opposite the first surface whereby the pin is extendable through the via with the via corresponding in position to the through-hole and the pin. The press-fit connector is disposable to be secured in a position proximate to the PCB and to be inserted into the via with guidance provided by the pin against the bias.

The above-described aspects of the invention address the shortcomings of the prior art by providing a compliant pin pre-screening, guiding and quality monitoring apparatus that is capable of pre-screening inaccurate via positions and sizes of a PCB and that is capable of pre-screening press-fit connectors that are out of position. In addition, pins of the compliant pin pre-screening, guiding and quality monitoring apparatus have a funnel shape that secures and guides the press-fit connectors during insertions and a monitoring system provides monitoring functionality during press-fit processes, alerts when abnormal conditions are detected and an ability to perform failure analysis for press-fit defects.

Turning now to a more detailed description of aspects of the present invention, FIG. 1 depicts a working table 101 having an uppermost surface 102. A fixed plate 110 has a body 111 with a first or lower surface 112 and a second or upper surface 113 opposite the lower surface 112. The body 111 is formed to define a through-hole array 114 including one or more through-holes 115 that extend through the body 111 from the lower surface 112 to the upper surface 113. The fixed plate 110 is disposable above the working table 101 such that the lower surface 112 faces the uppermost surface 102 at a distance D.

A movable plate 120 is disposable to be urged by a bias against the lower surface 112 of the fixed plate 110. The movable plate 120 includes a pin array 121 with pins 122 that are respectively extendable through corresponding ones of the through-holes 115 of the through-hole array 114. The movable plate 120 includes spring-loaded supports 123 that provide the bias of the movable plate 120 against the lower surface 112 and has a thickness T, which is less than the distance D. Thus, when the movable plate 120 is biased to abut the lower surface 112, the movable plate 120 is displaced from the uppermost surface 102 by a displacement distance DD, which is substantially equal to a difference between the distance D and the thickness T. As such, the movable plate 120 is configured to occupy and move between an abutment position (see FIGS. 1, 3 and 4), at which the movable plate 120 is biased to abut with the lower surface 112, and an insertion position (see FIGS. 5 and 6, to be described below), at which the movable plate 120 has been forced to move away from the lower surface 112 against the bias applied thereto.

Each of the pins 122 of the movable plate 120 includes an elongate element 130, which is formed of conductive material, a liner 131, which is formed of non-conductive material, and a conductive element 132, which is formed of conductive material. The elongate element 130 extends from a surface of the movable plate 120 and the liner 131 surrounds the elongate element 130. The liner 131 thus electrically isolates the elongate element 130 from the fixed plate 110 or any other feature through which the pins 122 extend. The conductive element 132 extends from the elongate element 130 through the movable plate 120. The conductive element 132 can include or be provided as an elastic member, such as a compression spring. As such, the conductive element 132 can compensate for pin height tolerances.

Figure 2:
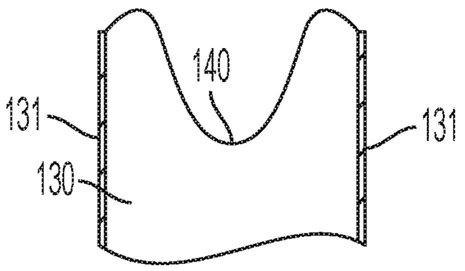
FIG. 2 is an enlarged view of the encircled portion of FIG. 1.

With reference to FIG. 2 and in accordance with embodiments, each of the pins 122 can include a distal end which is formed to define a funnel-shaped funnel 140. The funnel 140 includes elevated or extended sidewalls and a central depression.

Figure 3:
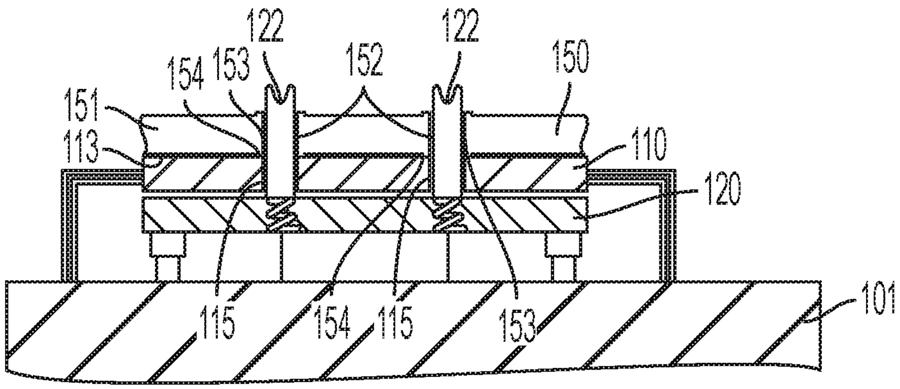
FIG. 3 is a schematic side view of a fixed plate, a movable plate and a printed circuit board (PCB) of a compliant pin pre-screening, guiding and quality monitoring apparatus in accordance with embodiments of the invention.

With reference to FIG. 3, a PCB 150 is provided and includes a PCB body 151, which is formed to define an array 152 of vias 153, and liners 154 that respectively line the interior sidewalls of each of the vias 153. The PCB 150 is disposable on the upper surface 113 of the fixed plate 110. In an event the vias 153 respectively correspond in position and size to corresponding ones of the through-holes 115 and the pins 122, the PCB 150 will sit flush on the upper surface 113. On the other hand, in an event the vias 153 do not respectively correspond in position and size to corresponding ones of the through-holes 115 and the pins 122, the PCB 150 will not sit flush on the upper surface 113. In this way, a configuration of the PCB 150 can be pre-screened (the pre-screening can also consider whether the sizes of the vias 153 are excessively large in which case the PCB 150 will sit flush on the second surface 113 but will not be secured in place).

Figure 4:
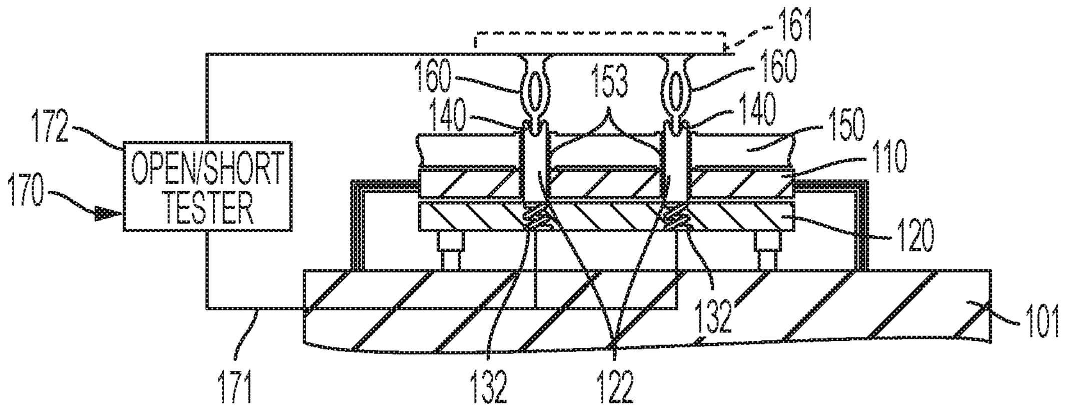
FIG. 4 is a schematic side view of a fixed plate, a movable plate, a printed circuit board (PCB) and press-fit connectors of a compliant pin pre-screening, guiding and quality monitoring apparatus in accordance with embodiments of the invention.

With reference to FIG. 4, press-fit connectors 160 are disposable to be secured as a group in position proximate to and above the upper surface 113 and to be inserted as the group into the vias 153 with guidance that is provided by the pins 122 against the bias which is applied to the movable plate 120 that causes the movable plate 120 to abut the lower surface 112.

As shown in FIG. 4, each of the press-fit connectors 160 can be supported on a jig 161 and can include or be provided with an Eye-Of-Needle (EON) configuration. The EON configuration is characterized in that the press-fit connector 160 has a head that can be connected to or supported on the jig 161, a neck extending from the head, a bottom opposite the neck and lateral members that curvilinearly extend between the neck and the bottom in diverging and converging directions. As such, each of the press-fit connectors 160 with the EON configuration has a normal width that can be laterally compressed during an insertion process and released.

With each of the press-fit connectors 160 provided as described above, the respective bottoms can be received in the funnels 140 of each of the pins 122. In this way, the positioning of each of the press-fit connectors 160 can be pre-screened. In addition, each of the press-fit connectors 160 that is properly aligned and positioned can be secured in that alignment and position during subsequent insertion processing.

In accordance with further embodiments, monitoring circuitry 170 can be operably coupled to each of the pins 122 and each of the press-fit connectors 160. The monitoring circuitry 170 can include or be provided as one or more nets 171, to which the conductive elements 132 and the press-fit connectors 160 are electrically coupled, and a testing controller 172. The testing controller 172 can include a processing unit and a memory on which executable instructions are stored. The executable instructions are readable and executable by the processing unit such that, when the executable instructions are read and executed by the processing unit, the executable instructions cause the processing unit to operate as described herein.

For example, when the executable instructions are read and executed by the processing unit, the executable instructions can cause the processing unit to determine whether any of the press-fit connectors 160 are or are not making reliable electrical connections with the corresponding one of the pins 122 (i.e., due to misalignments or positional non-correspondence, due to any of the faults noted above, etc.), to issue a notification in an event all of the press-fit connectors 160 are making reliable electrical connections with the corresponding one of the pins 122, to issue alerts in an event any of the press-fit connectors 160 are not making reliable electrical connections with the corresponding one of the pins 122 and to provide supporting data for subsequent failure analyses.

Figure 5:
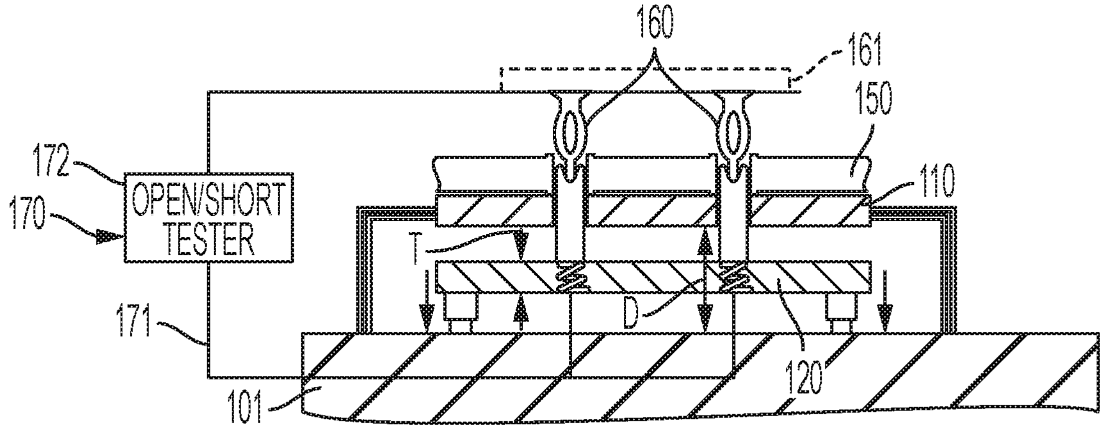
FIG. 5 is a schematic side view of the fixed plate, the movable plate, the PCB and the press-fit connectors of FIG. 4 during an insertion process in accordance with embodiments of the invention.
Figure 6:
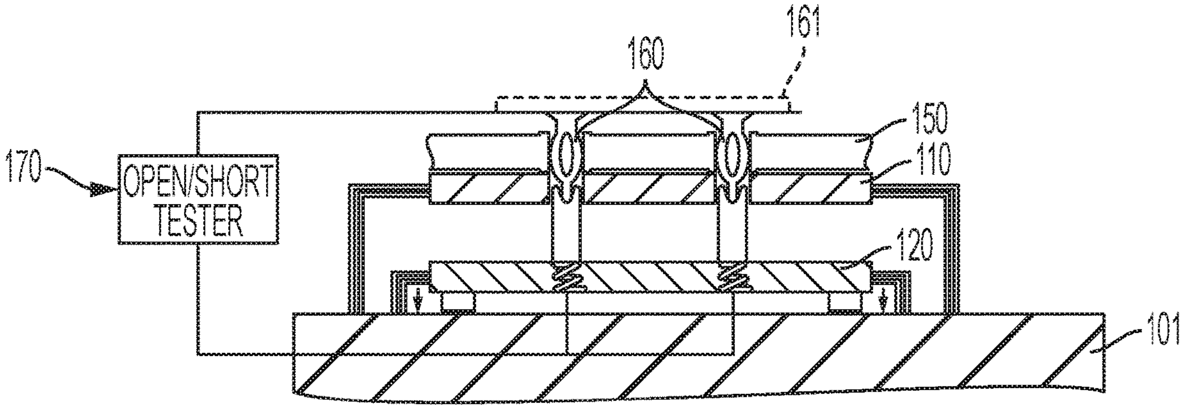
FIG. 6 is a schematic side view of the fixed plate, the movable plate, the PCB and the press-fit connectors of FIG. 5 during a late stage of an insertion process in accordance with embodiments of the invention.

With reference to FIGS. 5 and 6, the press-fit connectors 160 can be inserted as a group into the vias 153. Where the press-fit connectors 160 are provided on the jig 161, the insertion can be executed by an application of pressure onto the jig 161 that is sufficient to overcome the bias applied onto the movable plate 120. This application of pressure onto the movable plate 120 causes the movable plate 120 to be to move away from the abutment position (see FIG. 5) and toward the insertion position (see FIG. 6).

As shown in FIG. 6, with the fixed plate 110 being fixed in height above the working table 101 at the distance D and the movable plate 120 having the thickness T, it is to be understood that the distance D is equal to or greater than the thickness T of the movable plate 120 and an insertion stroke length of the press-fit connector 160. That is, once the movable plate 120 comes close to or contacts with the uppermost surface 102, the press-fit connectors 160 are fully inserted into the vias 153.

Figure 7:
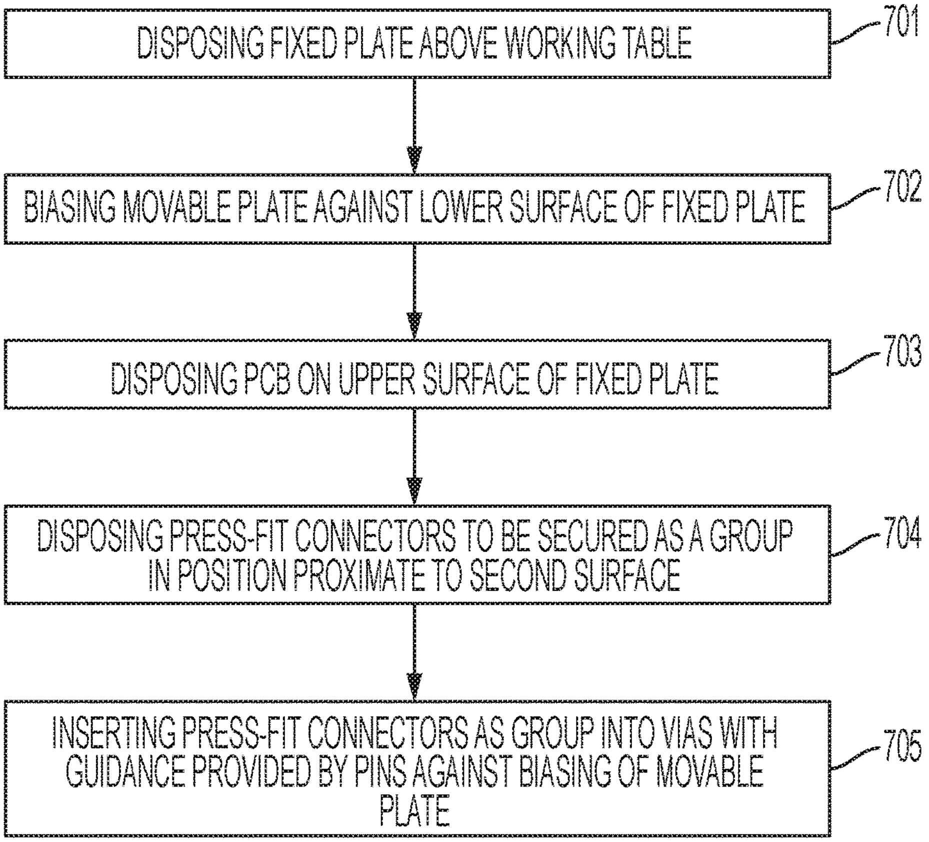
FIG. 7 is a flow diagram illustrating a compliant pin pre-screening, guiding and quality monitoring method in accordance with embodiments of the present invention.

With reference to FIG. 7, a compliant pin pre-screening, guiding and quality monitoring method is provided. As shown in FIG. 7, the compliant pin pre-screening, guiding and quality monitoring method includes disposing a fixed plate defining through-holes above a working table (701), biasing a movable plate against a lower surface of the fixed plate such that pins of the movable plate extend through the through-holes (702), disposing a printed circuit board (PCB) defining vias on an upper surface of the fixed plate whereby the pins extend through the vias with the vias corresponding in position to the through-holes and the pins (703), disposing press-fit connectors to be secured as a group in position proximate to the PCB (704) and inserting the press-fit connectors as the group into the vias with guidance provided by the pins against the biasing of the movable plate (705).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A compliant pin pre-screening, guiding and quality monitoring apparatus, comprising:

a fixed plate defining a through-hole and being disposable above a working table;

a movable plate disposable to be urged by a bias against a first surface of the fixed plate facing the working table and comprising a pin extendable through the through-hole;

a printed circuit board (PCB) defining a via and being disposable on a second surface of the fixed plate opposite the first surface whereby the pin is extendable through the via with the via corresponding in position to the through-hole and the pin; and a press-fit connector disposable to be secured in position proximate to the PCB and to be inserted into the via with guidance provided by the pin against the bias.

2. The compliant pin pre-screening, guiding and quality monitoring apparatus according to claim 1, wherein:

the fixed plate defines the through-hole in a through-hole array, the movable plate comprises the pin as a pin of a pin array, and the PCB defines the via in an array of vias.

3. The compliant pin pre-screening, guiding and quality monitoring apparatus according to claim 1, wherein the fixed plate is fixed in height above the working table.

4. The compliant pin pre-screening, guiding and quality monitoring apparatus according to claim 3, wherein the movable plate is disposable in an abutting position at which the movable plate is urged by the bias against the first surface and an insertion position at which the movable plate is displaced in opposition to the bias from the first surface.

5. The compliant pin pre-screening, guiding and quality monitoring apparatus according to claim 3, wherein a distance between the working table and the first surface is equal to or greater than a thickness of the movable plate and an insertion stroke length of the press-fit connector.

6. The compliant pin pre-screening, guiding and quality monitoring apparatus according to claim 1, wherein the pin comprises a funnel which is receptive of the press-fit connector.

7. The compliant pin pre-screening, guiding and quality monitoring apparatus according to claim 1, wherein a configuration of the PCB is configured to be pre-screened with the via being misaligned with the through-hole and the pin.

8. The compliant pin pre-screening, guiding and quality monitoring apparatus according to claim 1, further comprising monitoring circuitry operably coupled to the pin and the press-fit connector.

9. The compliant pin pre-screening, guiding and quality monitoring apparatus according to claim 8, wherein the monitoring circuitry is configured to pre-screen a position of the pin prior to pin insertion.

10. A compliant pin pre-screening, guiding and quality monitoring apparatus, comprising:

a fixed plate defining a through-hole array and being disposable above a working table;

a movable plate disposable to be urged by a bias against a first surface of the fixed plate facing the working table and comprising a pin array with pins extendable through through-holes of the through-hole array;

a printed circuit board (PCB) defining an array of vias and being disposable on a second surface of the fixed plate opposite the first surface whereby the pins are extendable through the vias with the vias corresponding in position to the through-holes and the pins; and press-fit connectors disposable to be secured as a group in position proximate to the PCB and to be inserted as the group into the vias with guidance provided by the pins against the bias.

11. The compliant pin pre-screening, guiding and quality monitoring apparatus according to claim 10, wherein the fixed plate is fixed in height above the working table.

12. The compliant pin pre-screening, guiding and quality monitoring apparatus according to claim 11, wherein the movable plate is disposable in an abutting position at which the movable plate is urged by the bias against the first surface and an insertion position at which the movable plate is displaced in opposition to the bias from the first surface.

13. The compliant pin pre-screening, guiding and quality monitoring apparatus according to claim 11, wherein a distance between the working table and the first surface is equal to or greater than a thickness of the movable plate and an insertion stroke length of the press-fit connector.

14. The compliant pin pre-screening, guiding and quality monitoring apparatus according to claim 10, wherein each of the pins comprises a funnel which is receptive of a corresponding one of the press-fit connectors.

15. The compliant pin pre-screening, guiding and quality monitoring apparatus according to claim 10, wherein a configuration of the PCB is configured to be pre-screened with one or more of the vias being misaligned with corresponding ones or more of the through-holes and the pins.

16. The compliant pin pre-screening, guiding and quality monitoring apparatus according to claim 10, further comprising monitoring circuitry operably coupled to each of the pins and each of the press-fit connectors.

17. The compliant pin pre-screening, guiding and quality monitoring apparatus according to claim 16, wherein the monitoring circuitry is configured to pre-screen a position of each of the pins prior to group insertions of the pins.

* * * * *